![US008723363B2]

(12) United States Patent
Huang et al.

(10) Patent No.: US 8,723,363 B2
(45) Date of Patent: May 13, 2014

(54) UNINTERRUPTED POWER SUPPLY APPARATUS

(75) Inventors: Yanfei Huang, Shanghai (CN); Peiguo Liu, Shenzhen (CN); Juor-Ming Hsieh, Taipei (TW)

(73) Assignee: Voltronic Power Technology Corp., Taipei (TW)

( * ) Notice: Subject to any disclaimer, the term of this patent is extended or adjusted under 35 U.S.C. 154(b) by 1049 days.

(21) Appl. No.: 12/768,146

(22) Filed: Apr. 27, 2010

(65) Prior Publication Data

US 2011/0260541 A1    Oct. 27, 2011

(51) Int. Cl.
*H02J 9/00* (2006.01)
*H02J 7/02* (2006.01)
*H02J 7/00* (2006.01)

(52) U.S. Cl.
CPC ............... *H02J 9/00* (2013.01); *H02J 7/0052* (2013.01); *H02J 7/02* (2013.01)
USPC .................................. 307/66; 307/64; 307/65

(58) Field of Classification Search
CPC .............. H02J 9/00; H02J 7/0052; H02J 7/02
USPC ........................................................ 307/64–66
See application file for complete search history.

(56) References Cited

U.S. PATENT DOCUMENTS 3,721,888 A * 3/1973 Allport .......................... 320/123

* cited by examiner

*Primary Examiner* — Hal Kaplan
(74) *Attorney, Agent, or Firm* — Rosenberg, Klein & Lee (57) ABSTRACT

Disclosed is an uninterrupted power supply apparatus, comprising a rectifying unit outputs a positive half-cycle of voltage potential and a negative half-cycle of voltage potential; a backup battery outputs a backup voltage; a first boost unit receives the positive half-cycle of voltage potential or the backup voltage and outputs a first voltage; a second boost unit receives the negative half-cycle of voltage potential or the backup voltage and outputs a second voltage; a current shunt unit receives the first voltage and the second voltage and outputs an AC output voltage; a charge circuit, coupled to the rectifying unit, the backup battery, and the first and/or the second boost unit, for being capable of controlling the first and/or the second boost unit to either store a charging power or charge the backup battery by applying the stored charging power alternatively and successively.

5 Claims, 5 Drawing Sheets

UNINTERRUPTED POWER SUPPLY APPARATUS

BACKGROUND OF THE INVENTION

1. Field of the Invention

The present invention relates to an uninterrupted power supply apparatus, and more particularly, to an uninterrupted power supply apparatus which is capable of charging to a backup battery as the public electrical power distribution system is supplying power.

2. Description of Related Art

Figure 1:
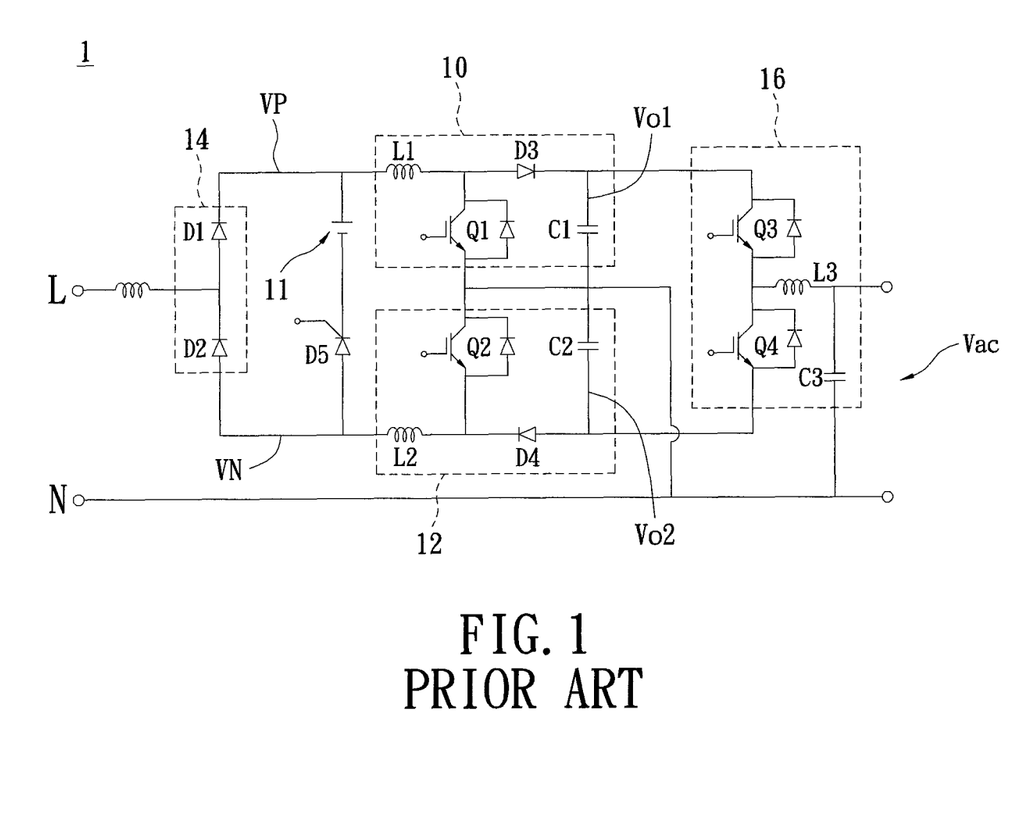
FIG. 1 illustrates a circuit schematic diagram of a conventional uninterrupted power supply apparatus.

A conventional uninterrupted power supply apparatus by applying double boost converter 1, as shown in FIG. 1, utilizes two sets of boost converters 10, 12 to perform boosting voltages and power factor correction in a public electrical power supply mode. Herein, the two sets of boost converters 10, 12 receive a positive half-cycle of voltage potential VP and a negative half-cycle of voltage potential VN from a rectifying unit 14 respectively, perform boosting voltage and power factor correction for the positive half-cycle of voltage potential VP and the negative half-cycle of voltage potential VN alternatively and successively, and convert outputs to a first output voltage Vo1 and a second output voltage V02. The two sets converters 10, 12, transfer the first output voltage Vo1 and the second output voltage Vo2 alternatively and successively to a current shunt 16, meanwhile, the current shunt 16 may shunt the first output voltage Vo1 and the second output voltage Vo2 and allow an AC output power Vac to pass.

Again, referring to FIG. 1, the uninterrupted power supply apparatus by applying double boost converters 1 functions in the public electrical power supply mode, a backup battery applied can not perform charging in the circuitry Moreover, even though the backup battery is not in function, the backup battery 11 itself may perform self-discharging, thereby resulting in running out of power sometimes. Because the conventional uninterrupted power supply apparatus by applying double boost converters 1 itself doesn't provide a charger, the backup battery 11 used which is required must be charged by an external charger. As a result, the conventional uninterrupted power supply apparatus by applying double boost converters 1 often need to design an additional charger module (not shown) individually, so as to charge the backup battery 11, thereby increasing manufacturing cost, causing inconvenience of use, and increasing defect rate for electronic products.

SUMMARY OF THE INVENTION

In view of the aforementioned issues, the present invention provides an uninterrupted power supply apparatus which applies a certain portion in accordance with a boost circuit to perform charging to a backup battery under the public electrical power supply mode.

To achieve the aforementioned objectives, disclosed is a first embodiment of an uninterrupted power supply apparatus according to the present invention, comprising: a rectifying circuit, a backup battery, a first boost unit, a second boost unit, a charge circuit, and a current shunt unit. Herein, the rectifying unit has a positive output terminal and a negative output terminal, wherein the positive output terminal outputs a positive half-cycle of voltage potential and the negative output terminal outputs a negative half-cycle of voltage potential. The backup battery has a positive terminal and a negative terminal for outputting a backup voltage. The first boost unit, coupled to the positive output terminal of the rectifying unit and the positive terminal of the backup battery, for receiving the positive half-cycle of voltage potential or the backup voltage and outputting a first voltage. The second boost unit, coupled to the negative output terminal and the negative terminal of the backup battery for receiving the negative half-cycle of voltage potential or the backup voltage and outputting a second voltage.

The charge circuit, coupled to the rectifying unit, the backup battery, and the second boost unit, for being capable of controlling the second boost unit to either store a charging power or charge the backup battery by applying the stored charging power alternatively and successively. The current shunt unit, coupled to the first boost unit and the second boost unit, for receiving the first voltage and the second voltage and outputting an AC output voltage.

A main difference between a second embodiment of an uninterrupted power supply apparatus according to the present invention and the first embodiment thereof is the charge circuit of the second embodiment, coupled to the rectifying unit, the backup battery, and the first boost unit, for being able to control the first boost unit to either store a charging power or charge the backup battery by applying the charging power alternatively and successively.

A main difference between a third embodiment of an uninterrupted power supply apparatus according to the present invention and the first embodiment thereof is the charge circuit of the second embodiment, coupled to the rectifying unit, the backup battery, the first boost unit, and the second boost unit, for being able to control the second boost unit to either store a first charging power or charge the backup battery by applying the first charging power alternatively and successively, and control the first boost unit to either store a second charging power or charge the backup battery by applying the second charging power alternatively and successively.

In view of the aforementioned issues, the present invention provides the uninterrupted power supply apparatus to utilize a charge circuit to first store the charging power in the first boost unit or/and the second boost unit in the public electrical power supply mode, and then apply the charging power on the backup battery to charge. Thus, the uninterrupted power supply apparatus according to the present invention may charge the backup battery without applying an additional charger, thereby reducing the overall production cost of the uninterrupted power supply apparatus, enhancing convenience of use significantly, and quality of the supply of electrical power.

DETAILED DESCRIPTION OF THE PREFERRED EMBODIMENTS

Figure 2:
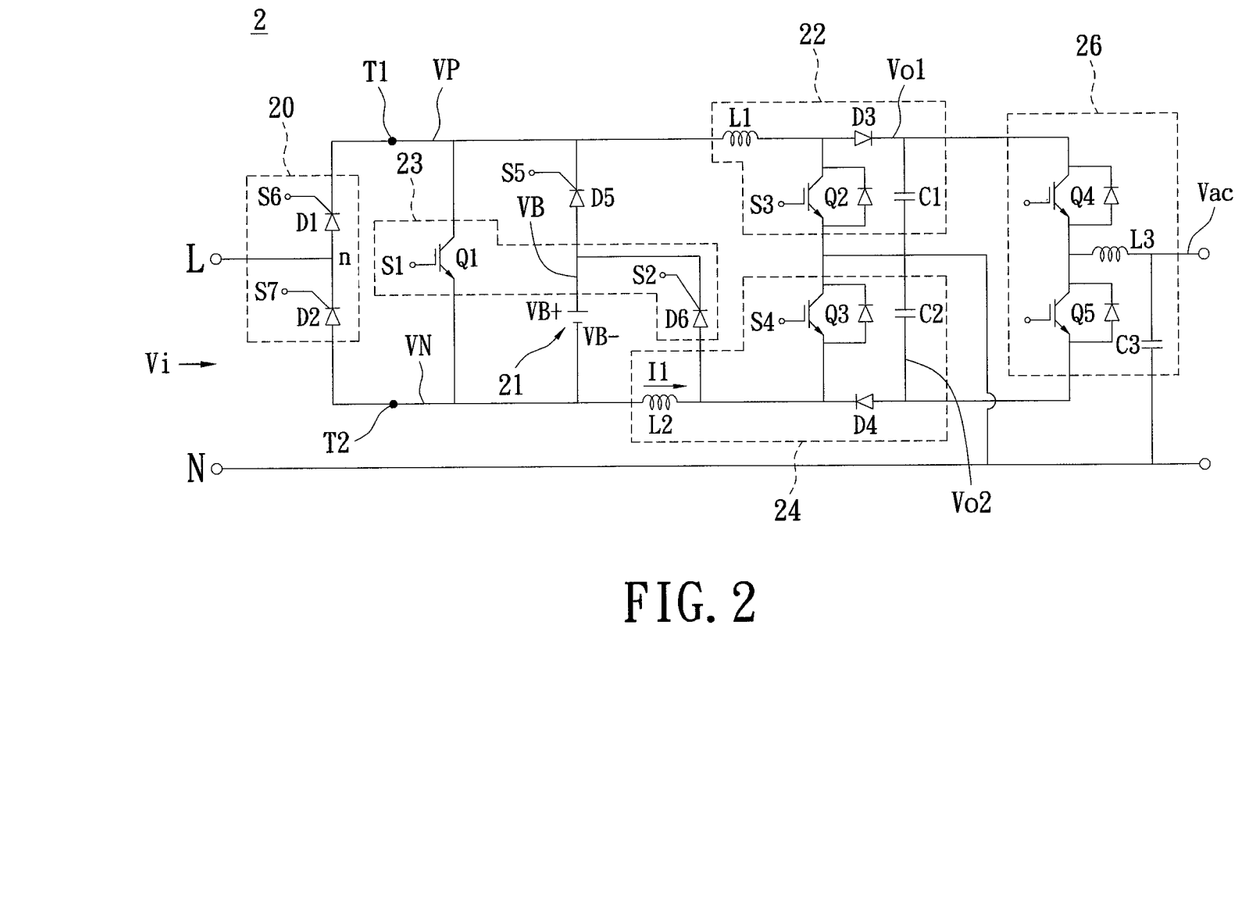
FIG. 2 illustrates a circuit schematic diagram of a first embodiment of an uninterrupted power supply apparatus in accordance with certain aspects of the present invention.

Please refer to FIG. 2, in which a circuit schematic diagram of a first embodiment of an uninterrupted power supply apparatus in accordance with certain aspects of the present invention is demonstrated. An uninterrupted power supply apparatus 2 comprises a rectifying unit 20, a backup battery 21, a first boost unit 22, a charge circuit 23, a second boost unit 24, and current shunt unit 26. herein, the rectifying unit 20 is composed of two silicon controlled rectifier D1, D2, which has a node n, a positive output terminal T1, and a negative output terminal T2, in which the node n couples to an AC power line L.

The rectifying unit 20 rectifies an AC input power Vi successively and outputs a positive half-cycle of voltage potential VP and a negative half-cycle of voltage potential from the positive output terminal T1 and the negative output terminal T2 respectively and alternatively. Meanwhile, the backup battery 21 has a positive terminal VB+ and a negative terminal VB−, for outputting a backup voltage VB. The aforementioned silicon controlled rectifiers D1, D2 are being controlled by gate signals S6, S7 so as to switch between conduction and cutoff. As the silicon controlled rectifiers D1, D2 are conducted, the AC input power Vi is being performed rectification process Additionally, As the silicon controlled rectifiers D1, D2 are cutoff, the rectification process of the AC input power Vi is ceased, thereby providing protection as the abnormality of power supply occurs, e.g. blackout or high voltage.

Again please refer to FIG. 2. The first boost unit 22 coupled to the positive output terminal T1 of the rectifying unit 20 and the positive terminal VB+ of the backup battery 21, for receiving the positive half-cycle of voltage potential VP or the backup battery VB and outputting a first voltage Vo1. At the same time, the second boost unit 24 coupled to the negative output terminal T2 of the rectifying unit 20 and the negative terminal VB− of the backup battery 21 for receiving the negative half-cycle of voltage potential VN or the backup voltage VB and outputting a second voltage Vo2. The current shunt unit 26 coupled to the first boost unit 22 and the second boost unit 24 for receiving the first voltage Vo1 and the second voltage Vo2 and outputting an AC output voltage Vac to supply it on loads (not shown).

The positive terminal VB+ of the backup battery 21 connects to the first boost unit 22 and the second boost unit 24 by ways of a mode switching diode D5. The mode switch diode D5 is controlled by a power control signal S5. Therefore, as the power control signal S5 represents that the supply of the AC input power Vi is normal, the mode switching diode D5 is controlled to be cut off so as to allow the backup battery 21 to be disconnected with the first boost unit 22 and the second boost unit 24.

As the power control signal S5 represents that the supply of the AC input power Vi is abnormal, the mode switch diode D5 is controlled to be in a conduction state so as to allow the backup battery 21 to connect with the first boost unit 22 and the second boost unit 24 for supplying power on the loads (not shown). Meanwhile, the silicon controlled rectifiers D1, D2 are cut off for providing protection as the abnormality of power supply occurs, e.g. blackout or high voltage.

The charge circuit 23 couples to the rectifying unit 20, the backup battery 21, and the second boost unit 24 as shown in FIG. 2. As the AC input power Vi is supplied normally, the charge circuit 23 controls the second boost unit 24 to store a charging power I1 and controls the charging power I1 to apply on the backup battery 21 so as to charge the backup battery 21 alternatively. The charge circuit 23 of the first embodiment in accordance with the present invention comprises a charging switch Q1 and a charging path thyristor D6. Herein, the charging switch Q1 connects to the rectifying unit 20, the backup battery 21, and the second boost unit 24. As the AC input power Vi is supplied normally, the charging switch Q1 is controlled by a first control signal S1 which is a high frequency switch signal, for controlling the charging switch Q1 to be conducted or cut off The charging path thyristor D6 is controlled by a second control signal S2 which is a low frequency control signal.

While the AC input power Vi is in the positive half-cycle, the charging path thyristor D6 is controlled by the second control signal S2 to be in a conduction state. Also, the first control signal S1 controls the charging switch Q1 to be conducted, so as to enable the positive half-cycle of voltage potential VP outputted from the rectifying unit 20 to be transferred to the second boost unit 24 by means of the charging switch Q1, and then further store the charging power I1 into the second boost unit 24. Subsequently, the first control signal S1 controls the charging switch Q1 to be cut off, so as to enable the charging power I1 to pass to the backup battery 21 by ways of the charging path thyristor D6 for charging the backup battery 21.

Refer to FIG. 2 again. While the AC input power Vi supplies power normally, the first boost unit 22 and the second boost unit 24 in accordance with the first embodiment of the uninterrupted power supply apparatus 2 may alternatively receive the positive half-cycle of voltage potential VP and the negative half-cycle of voltage potential VN from the rectifying unit 20, and respectively transform the positive half-cycle of voltage potential VP and the negative half-cycle of voltage potential VN into the first output voltage Vo1 and the second output voltage Vo2. The current shunt unit 26 receives the first voltage Vo1 and the second voltage Vo2 and outputs the AC output voltage Vac to apply power for the loads (not shown)

Please refer FIG. 2 again. In the first embodiment of the present invention, the first boost unit 22 includes a first inductor L1, a first boost switch Q2, a first flywheel diode D3, and a first capacitor C1, wherein a terminal of the first inductor L1 connects to the positive output terminal T1 of the rectifying unit 20. An input terminal of the first boost switch Q2 connects to another terminal of the first inductor L1, an output terminal of the first boost switch Q2 connects to am AC neutral line N, and a control terminal of the first boost unit Q2 receives a third control signal S3. An anode of the first flywheel diode D3 connects to the other terminal of the first inductor L1. The first capacitor C1 connects to a cathode of the first flywheel diode D3 and the AC neutral line N and outputs the first voltage Vo1. In the aforementioned descriptions, the third control signal S3 is a high frequency switch signal for controlling the first boost switch Q2 to perform switching operations and further transforming the positive half-cycle of voltage potential VP outputted from the rectifying unit 20 into the first output voltage Vo1.

In the first embodiment of the present invention as shown in FIG. 2, the second boost unit 24 includes a second inductor L2, a second boost switch Q3, a second flywheel diode D4, and second capacitor C2, wherein s terminal of the second inductor L2 connects to the negative output terminal T2 of the rectifying unit 20. An output terminal of the second boost switch Q3 connects to another terminal of the second inductor L2, an input terminal of the second boost switch Q3 connects to am AC neutral line N, and a control terminal of the second boost unit Q3 receives a fourth control signal S4. A cathode of the second flywheel diode D4 connects to the other terminal of the second inductor L2. The second capacitor C2 connects to an anode of the second flywheel diode D4 and the AC neutral line N and outputs the second voltage Vo2. In the aforementioned descriptions, the fourth control signal S4 is a high frequency switch signal for controlling the second boost switch Q3 to perform switching operations and further transforming the negative half-cycle of voltage potential VN outputted from the rectifying unit 20 into the second output voltage Vo2.

As the aforementioned first control signal S1 controls the charging switch Q1 to be conducted, the positive half-cycle of voltage potential VP outputted from the rectifying unit 20 is applied by means of the silicon controlled rectifier D1 in the rectifying unit 20, the charging switch Q1, the second inductor L2, and a diode in the second boost switch Q3 for storing the charging power I1 in the second inductor L2.

In the first embodiment of the present invention as shown in FIG. 2, the current shunt unit 26 includes a first shunt switch Q4, as second shunt switch Q5, an output inductor L3, and an output capacitor C3. Therein, an input terminal of the first shunt switch Q4 connects to the cathode of the first flywheel diode D3. An output terminal of the second shunt switch Q5 connects to an output terminal of the first shunt switch Q4, and meanwhile, an output terminal of the second shunt switch Q5 connects to the anode of the second flywheel D4. A first terminal of the output inductor L2 connects to the input terminal of the second shunt switch Q5. The output capacitor C3 connects to the other terminal of the output inductor L3 and the AC neutral line N and outputs the AC output voltage Vac. Thus, the first shunt switch Q4 and the second shunt switch Q5 of the current shunt unit 26 are capable of shunting the first output voltage Vo1 and the second output voltage Vo2 so as to output the AC output voltage Vac. Yet, the current shunt unit 26 is not the only option for achieving shunting according to the present invention. As long as the technical proposals are able of transforming DC power into AC power, they are within the scope with respect to the present invention.

Figure 3:
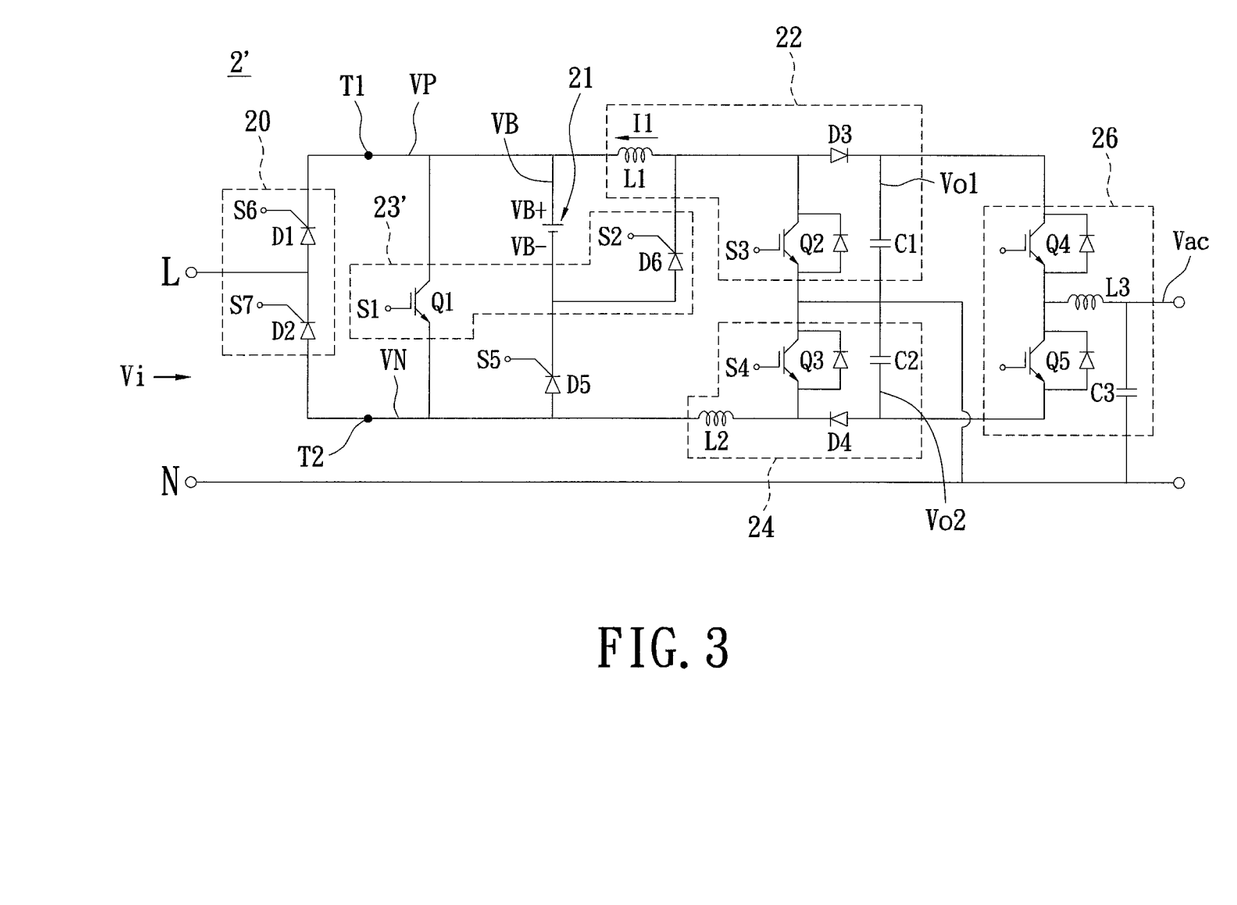
FIG. 3 illustrates a circuit schematic diagram of a second embodiment of an uninterrupted power supply apparatus in accordance with certain aspects of the present invention.

Please refer to FIG. 3 in conjunction with FIG. 2, in which a circuit schematic diagram of a second embodiment of an uninterrupted power supply apparatus in accordance with certain aspects of the present invention is demonstrated. The electronic components in the second embodiment according to the present invention which are the same as that of the first embodiment are indicated by the identical labels. The functional principles and achieved effect between the first embodiment and the second embodiment are the same, yet the only difference between them is the connection relationship in accordance with the internal components within the charge circuit 23'. The charge circuit 23' of the second embodiment in accordance with the uninterrupted power supply apparatus 2' includes a charging switch Q1 and a charging path thyristor D6, however, the charging path thyristor D6 of the charge circuit 23' is connected between the backup battery 21 and the first boost unit 22.

Refer to FIG. 3 again, as the AC input power Vi is in the negative half-cycle, the charging path thyristor D6 is controlled by the second control signal S2 to be in a conduction state. Meanwhile, the first control signal S1 controls the charging switch Q1 to be conducted so as to allow the negative half-cycle voltage potential VN outputted from the rectifying unit 20 applied on the silicon controlled rectifier D2 in the rectifying unit 20, the charging switch Q1, the first inductor L1, and a diode in the first boost switch Q2 for storing the charging power I1 in the first inductor L1. Then, the first control signal S1 controls the charging switch Q1 to be cut off so as to allow the charging power I1 applied on the backup battery 21 thru a conducted charging path thyristor D6 to charge the backup battery 21.

Figure 4:
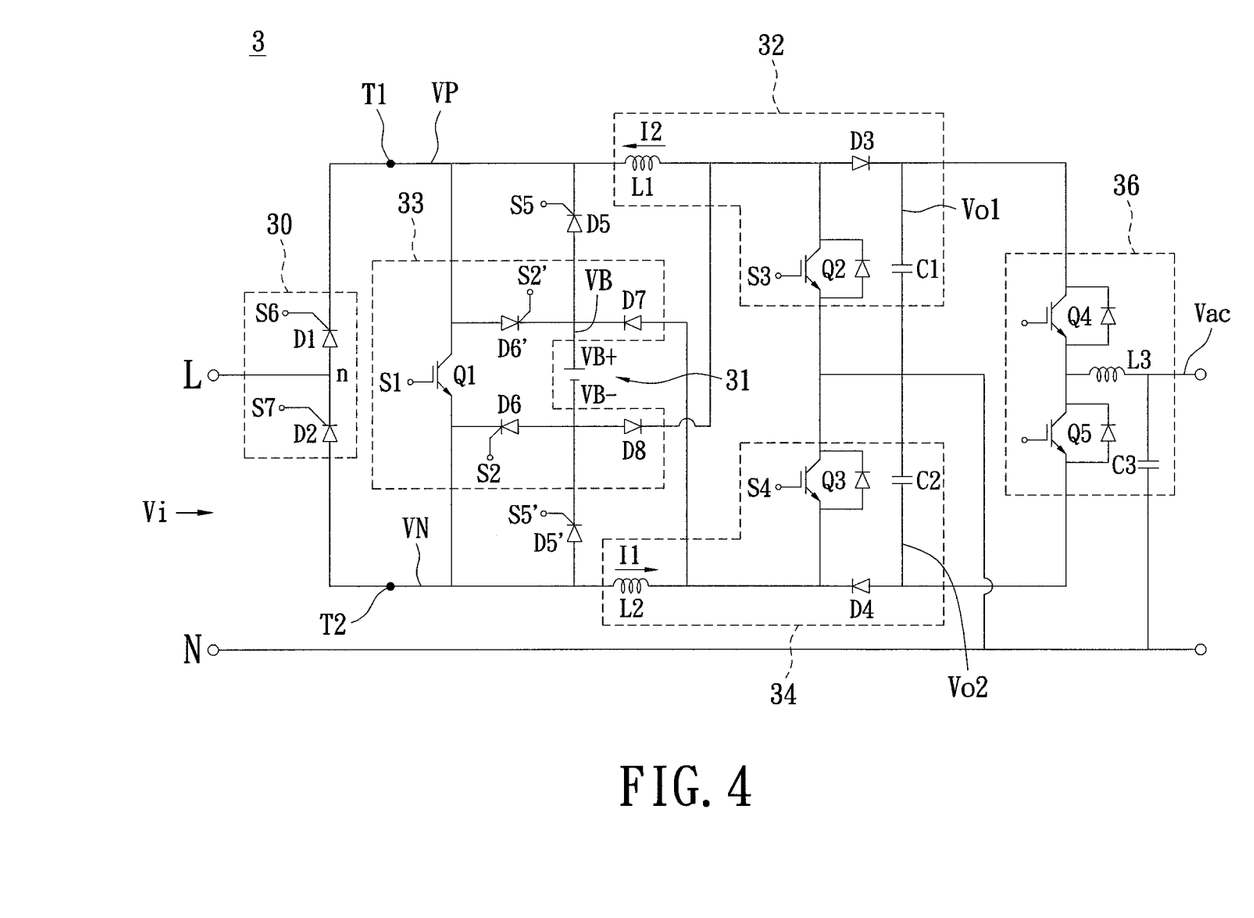
FIG. 4 illustrates a circuit schematic diagram of a third embodiment of an uninterrupted power supply apparatus in accordance with certain aspects of the present invention.

Please refer to FIG. 4, in which a circuit schematic diagram of a third embodiment of an uninterrupted power supply apparatus in accordance with certain aspects of the present invention is demonstrated. An uninterrupted power supply apparatus 3 according to the present invention is provided.

The uninterrupted power supply apparatus 3 comprises a rectifying unit 30, a backup battery 31, a first boost unit 32, a charge circuit 33, a second boost unit 34, and a current shunt unit 36. Herein, the rectifying unit 30 is composed of two silicon controlled rectifiers D1, D2, which have a node n inbetween, a positive output terminal T1 and a negative output terminal T2 and the node N couples to an AC power line L.

The rectifying unit 30 rectifies an AC input power Vi successively and outputs a positive half-cycle of voltage potential VP and a negative half-cycle of voltage potential from the positive output terminal T1 and the negative output terminal T2 respectively and alternatively. Meanwhile, the backup battery 31 has a positive terminal VB+ and a negative terminal VB−, for outputting a backup voltage VB. The aforementioned silicon controlled rectifiers D1, D2 are being controlled by gate signals S6, S7 so as to switch between conduction and cutoff. As the silicon controlled rectifiers D1, D2 are conducted, the AC input power Vi is being performed rectification process Additionally, As the silicon controlled rectifiers D1, D2 are cutoff, the rectification process of the AC input power Vi is ceased, thereby providing protection as the abnormality of power supply occurs, e.g. blackout or high voltage.

Again please refer to FIG. 4. The first boost unit 32 coupled to the positive output terminal T1 of the rectifying unit 30 and the positive terminal VB+ of the backup battery 31, for receiving the positive half-cycle of voltage potential VP or the backup battery VB and outputting a first voltage Vo1. At the same time, the second boost unit 34 coupled to the negative output terminal T2 of the rectifying unit 30 and the negative terminal VB− of the backup battery 31 for receiving the negative half-cycle of voltage potential VN or the backup voltage VB and outputting a second voltage Vo2. The current shunt unit 36 coupled to the first boost unit 32 and the second boost unit 34 for receiving the first voltage Vo1 and the second voltage Vo2 and outputting an AC output voltage Vac to supply it on loads (not shown).

The positive terminal VB+ and the negative terminal VB− of the backup battery 31 further respectively connects to the first boost unit 32 and the second boost unit 34 by ways of a first mode switching diode D5 and a second mode switch diode D5'. The first mode switch diode D5 and the second mode switching diode D5' are controlled by power control signals S5, S5'. Therefore, as the power control signals S5, S5' represents that the supply of the AC input power Vi is normal, the first mode switch diode D5 and the second mode switching diode D5' are controlled to be cut off so as to allow the backup battery 31 to be disconnected with the first boost unit 32 and the second boost unit 34.

As the power control signals S5, S5' represents that the supply of the AC input power Vi is abnormal, the first mode switch diode D5 and the second mode switching diode D5' are controlled to be in a conduction state so as to allow the backup battery 31 to connect with the first boost unit 32 and the second boost unit 34 for supplying power on the loads (not shown). Meanwhile, the silicon controlled rectifiers D1, D2 are cut off for providing protection as the abnormality of power supply occurs, e.g. blackout or high voltage.

The charge circuit 33 couples to the rectifying unit 30, the backup battery 31, the first boost unit 32, and the second boost unit 34 as shown in FIG. 4. As the AC input power Vi is supplied normally, the charge circuit 33 controls the second boost unit 34 to store a first charging power I1 and controls the first charging power I1 to apply on the backup battery 31 so as to charge the backup battery 31 alternatively. Moreover, the charge circuit 33 controls the first boost unit 32 to store a second charging power I2 and controls the second charging power I2 to apply on the backup battery 31 so as to charge the backup battery 31 alternatively.

The charge circuit 33 of the third embodiment in accordance with the present invention comprises a charging switch Q1 and a first charging path thyristor D6, a first charging path diode D7, a second charging path thyristor D6', and a second charging path diode D8. Herein, the charging switch Q1 connects to the rectifying unit 30, the first boost unit 32, and the second boost unit 34. And the first charging path diode D7 and the first charging path thyristor D6 are connected in series with the backup battery 31 and the second boost unit 34. In addition, the second charging path diode D8 and the second charging path thyristor D6' are connected in series with the backup battery 31 and the first boost unit 32. The aforementioned first charging path thyristor D6 is controlled by a second control signal S2, the aforementioned second charging path thyristor D6' is controlled by a third control signal S2', wherein the second control signal S2 and the third control signal S2' are all low frequency controls signals.

While the AC input power Vi is in the positive half-cycle, the first charging path thyristor D6 is controlled by the second control signal S2 to be in a conduction state and the second charging path thyristor D6' is controlled by the third control signal S2' to be in a cutoff state. Also, the first control signal S1 controls the charging switch Q1 to be conducted, so as to enable the positive half-cycle of voltage potential VP outputted from the rectifying unit 30 to be transferred to the second boost unit 34, and then further store the first charging power I1 into the second boost unit 34. Subsequently, the first control signal S1 controls the charging switch Q1 to be cut off, so as to apply the first charging power I1 on the backup battery 31.

The aforementioned first control signal S1 is a high frequency switch signal so as to control the charging switch to be conducted or cut off.

Additionally, when the AC input power Vi in is the negative half cycle, the second charging path thyristor D6' is controlled by the third control signal S2' to be in a conduction state and the first charging path thyristor D6 is controlled by the second control signal S2 to be in a cutoff state. Also, the first control signal S1 controls the charging switch Q1 to be conducted, so as to enable the negative half-cycle of voltage potential VN outputted from the rectifying unit 30 to be transferred to the first boost unit 32, and then further store the second charging power I2 into the first boost unit 32. Subsequently, the first control signal S1 controls the charging switch Q1 to be cut off, so as to apply the second charging power I2 on the backup battery 31.

To be more specific, as the AC input power Vi is in the positive half-cycle and the charging switch Q1 is conducted, the positive half-cycle of voltage potential VP outputted from the rectifying unit 30 may store the first charging power I1 in the second inductor L2 by means of the silicon controlled rectifier D1 of the rectifying unit 30, the charging switch Q1, the second inductor L2, the diode of the second boost switch Q3 Furthermore, as the charging switch Q1 is cut off, the second charging power I2 may be transferred to the backup battery 31 thru the second charging path diode D8 and the conducted second charging path thyristor D6' for charging the backup battery 31.

Refer to FIG. 4 again. While the AC input power Vi supplies power normally, the first boost unit 32 and the second boost unit 34 in accordance with the third embodiment of the uninterrupted power supply apparatus 3 may alternatively receive the positive half-cycle of voltage potential VP and the negative half-cycle of voltage potential VN from the rectifying unit 30, and respectively transform the positive half-cycle of voltage potential VP and the negative half-cycle of voltage potential VN into the first output voltage Vo1 and the second output voltage Vo2. The current shunt unit 36 receives the first voltage Vo1 and the second voltage Vo2 and outputs the AC output voltage Vac to apply power for the loads (not shown)

Meanwhile, as the AC input power Vi is provided normally, the charge circuit 33 of the third embodiment in accordance with the uninterrupted power supply apparatus 3 may transfer the positive half-cycle of voltage potential VP BP outputted from the rectifying unit 30 to the second boost unit 34, such that the second boost unit 34 may store the first charging power I1 and then apply the first charging power I1 to charge the backup battery 31. Moreover, the charge circuit 33 may transfer the negative half-cycle of voltage potential VN outputted from the rectifying unit 30 to the first boost unit 32, such that the first boost unit 32 may store the second charging power I2 and then apply the second charging power I2 to charge to backup battery 31.

Figure 5:
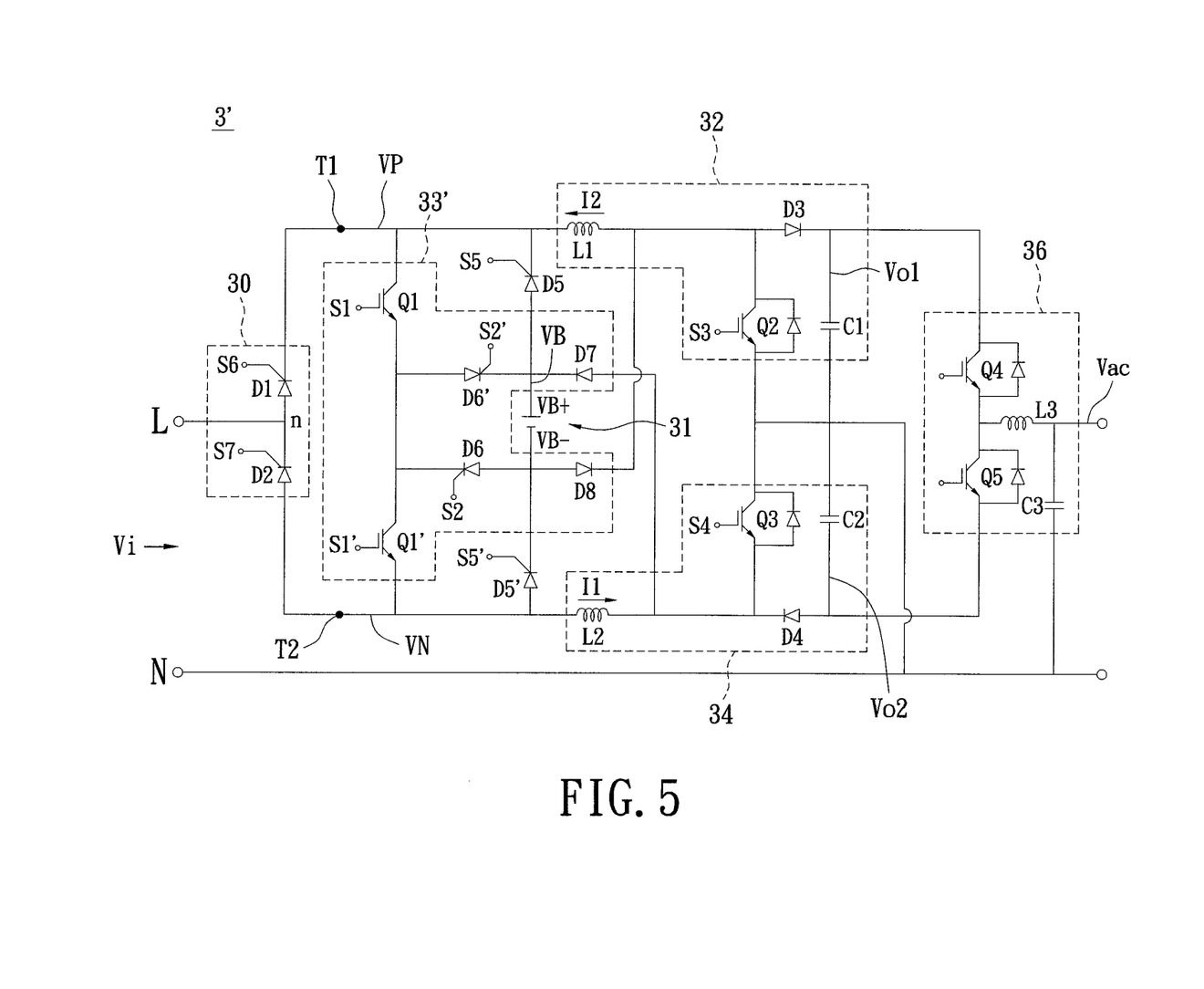
FIG. 5 illustrates a circuit schematic diagram of a fourth embodiment of an uninterrupted power supply apparatus according to the present invention.

Please refer to FIG. 5 in conjunction with FIG. 4, in which a circuit schematic diagram of a fourth embodiment of an uninterrupted power supply apparatus in accordance with certain aspects of the present invention is demonstrated. The electronic components in the fourth embodiment according to the present invention which are the same as that of the third embodiment are indicated by the identical labels. The functional principles and achieved effect between the third embodiment and the fourth embodiment are the same, yet the only difference between them is the connection relationship in accordance with the internal components within the charge circuit 33'. The charge circuit 33' of the fourth embodiment in accordance with the uninterrupted power supply apparatus 3' includes a first charging switch Q1 and a second charging switch Q1', wherein the first charging switch Q1 couples to the rectifying unit 30 and couples to the second boost unit 34 by ways of the second charging switch Q1'. The first charging switch Q1 is controlled by a control signal S1 so as to control the second boost unit 34 to store a first charging power I1 and control the first charging power I1 to charge the backup battery 31.

At the same time, the second charging switch Q1' couples to the rectifying unit 30 and couples to the first boost unit 32 by ways of the first charging switch Q1. The second charging switch Q1' is controlled by a control signal S1' so as to control the first boost unit 32 to store a second charging power I2 and control the second charging power I2 to charge the backup battery 31.

Refer to FIG. 5 again, as the AC input power Vi is in the positive half-cycle, the second charging switch Q1' is controlled by a control signal S1' to be in a conduction state, the first charging path thyristor D6 is controlled by the second control signal S2 to be in a conduction state, and the second charging path thyristor D6' is controlled by the control signal S2' to be in a cutoff state. Meanwhile, the first charging switch Q1 is conducted so as to allow the positive half-cycle voltage potential VP outputted from the rectifying unit 30 applied on the silicon controlled rectifier D1 in the rectifying unit 30, the first charging switch Q1, the conducted second charging switch Q1', the second inductor L2, and the diode in the second boost switch Q3 for storing the first charging power I1 in the second inductor L2. Then, the first charging switch Q1 is cut off so as to allow the first charging power I1 applied on the backup battery 31 thru the first charging path diode D7 and the conducted first charging path thyristor D6 to charge the backup battery 31.

Refer to FIG. 5 again, as the AC input power Vi is in the negative half-cycle, the first charging switch Q1 is controlled by a control signal S1 to be in a conduction state, the second charging path thyristor D6' is controlled by the second control signal S2' to be in a conduction state, and the first charging path thyristor D6 is controlled by the control signal S2 to be in a cutoff state. Meanwhile, the second charging switch Q1' is conducted so as to allow the negative half-cycle voltage potential VN outputted from the rectifying unit 30 applied on the silicon controlled rectifier D2 in the rectifying unit 30, the conducted first charging switch Q1, the second charging switch Q1', the first inductor L1, and the diode in the first boost switch Q2 for storing the second charging power I2 in the first inductor L1. Then, the second charging switch Q1' is cut off so as to allow the second charging power I2 applied on the backup battery 31 thru the second charging path diode D8 and the conducted second charging path thyristor D6' to charge the backup battery 31.

As per the aforementioned embodiments, the present invention provides the uninterrupted power supply apparatus to utilize a charge circuit to first store the charging power in the first boost unit or/and the second boost unit in the public electrical power supply mode, and then charge the backup battery by applying the charging power. Thus, the uninterrupted power supply apparatus according to the present invention may charge the backup battery without applying an additional charger, thereby reducing the overall production cost of the uninterrupted power supply apparatus, enhancing convenience of use significantly, and quality of the supply of electrical power.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. An uninterrupted power supply apparatus, comprising:
    a rectifying unit, having a positive output terminal and a negative output terminal, which outputs a positive half-cycle of voltage potential and a negative half-cycle of voltage potential respectively;
    a backup battery, having a positive terminal and a negative terminal, for outputting a backup voltage;
    a first boost unit, coupled to the positive output terminal of the rectifying unit and the positive terminal of the backup battery, for receiving the positive half-cycle of voltage potential or the backup voltage and outputting a first voltage;
    a second boost unit, coupled to the negative output terminal of the rectifying unit and the negative terminal of the backup battery, for receiving the negative half-cycle of voltage potential or the backup voltage and outputting a second voltage;
    a charge circuit, coupled to the rectifying unit, the backup battery, the first boost unit, and the second boost unit, for controlling the second boost unit to either store a first charging power or charge the backup battery by applying the first charging power alternatively and successively and for controlling the first boost unit to either store a second charging power or charge the backup battery by applying the second charging power alternatively and successively; and
    a current shunt unit, coupled to the first boost unit and the second boost unit, for receiving the first voltage and the second voltage and outputting an AC output voltage.

2. The uninterrupted power supply apparatus according to claim 1, wherein the rectifying unit further includes a node, coupled to an AC power line.

3. The uninterrupted power supply apparatus according to claim 1, wherein the backup battery couples to the first boost unit and the second boost unit by ways of a first mode switching diode and a second mode switch diode respectively, which are controlled by power control signals.

4. The uninterrupted power supply apparatus according to claim 1, wherein the charge circuit comprises:
    a charging switch, coupled to the rectifying unit, the first boost unit, and the second boost unit, being controlled by a first control signal to either store the first charging power to the second boost unit or charge the backup battery by applying the first charging power, or either store the second charging power to the first boost unit or charge the backup battery by applying the second charging power;
    a first charging path diode, coupled to the backup battery and the second boost unit;
    a first charging path thyristor, coupled to the backup battery and the second boost unit, being controlled by a second control signal;
    a second charging path diode, coupled to the backup battery and the first boost unit; and
    a second charging path thyristor, coupled to the backup battery and the first boost unit, being controlled by a third control signal;
    wherein, as the first charging path thyristor is conducted and the second charging path thyristor is cut off, the charging switch performs switching so as to control the first charging power to charge the backup battery and as the first charging path thyristor is cut off and the second charging path thyristor is conducted, the charging switch performs switching so as to control the second charging power to charge the backup battery.

5. The uninterrupted power supply apparatus according to claim 1, wherein the charge circuit comprises:
    a first charging switch, coupled to the rectifying unit, and the second boost unit, being controlled by a first control signal to either store the first charging power to the second boost unit or charge the backup battery by applying the first charging power;
    a first charging path diode, coupled to the backup battery and the second boost unit;
    a first charging path thyristor, coupled to the backup battery and the second boost unit, being controlled by a second control signal;
    a second charging path diode, coupled to the backup battery and the first boost unit;
    a second charging switch, coupled to the rectifying unit, and the first boost unit, being controlled by a third control signal to either store the second charging power to the first boost unit or charge the backup battery by applying the second charging power;
    a second charging path thyristor, coupled to the backup battery and the first boost unit, being controlled by a fourth control signal;
    wherein, as the second charging path thyristor is cut off and the second charging switch and the first charging path thyristor is conducted, the first charging switch performs switching so as to control the first charging power to charge the backup battery and as the first charging path thyristor is cut off and the first charging switch and the second charging path thyristor is conducted, the second charging switch performs switching so as to control the second charging power to charge the backup battery.

* * * * *